United States Patent [19]

Colanzi et al.

[11] Patent Number: 4,991,982
[45] Date of Patent: Feb. 12, 1991

[54] SEAL BEARING

[75] Inventors: Franco Colanzi; Angelo Vignotto, both of Turin, Italy

[73] Assignee: RIV-SKF Officine di Villar Perosa, S.P.A., Turin, Italy

[21] Appl. No.: 471,946

[22] Filed: Jan. 29, 1990

Related U.S. Application Data

[62] Division of Ser. No. 278,846, Dec. 2, 1988, Pat. No. 4,928,371.

[30] Foreign Application Priority Data

Dec. 23, 1987 [IT] Italy ................................ 68114 A/87

[51] Int. Cl.$^5$ ........................ F16C 33/78; F16C 33/74; F16J 15/32; F16J 15/40
[52] U.S. Cl. .................................... 384/486; 277/37; 277/38; 277/95; 384/477; 384/484
[58] Field of Search ............... 384/477, 481, 482, 484, 384/486; 277/37-39, 95, 153

[56] References Cited

U.S. PATENT DOCUMENTS

| 2,834,616 | 5/1958 | Gebert et al. | 384/486 X |
| 3,752,543 | 8/1973 | Schmidt | 384/484 |
| 4,544,168 | 10/1985 | Hans et al. | 384/486 X |
| 4,669,895 | 6/1987 | Colanzi et al. | 384/477 |
| 4,792,243 | 12/1988 | Takeuchi et al. | 277/152 X |

FOREIGN PATENT DOCUMENTS

| 3320063 | 12/1984 | Fed. Rep. of Germany | 384/477 |
| 2203502 | 10/1988 | United Kingdom | 277/152 |

Primary Examiner—Thomas R. Hannon
Attorney, Agent, or Firm—Eugene E. Renz, Jr.

[57] ABSTRACT

Bearing assembly comprising inner and outer rings and a plurality of rolling elements in the annular space between the rings means having a seat on the inner peripheral surface of one of the rings facing the annular space including a throat section having a saw tooth shaped axial profile, a seal system at least at one axial end of the annular space and having at least one generally rigid shield member, a cover member of resilient material covering at least a portion of the shield member, the shield member having a separate sleeve-shaped portion and with interposition of at least part of the elastomeric covering, in the annular with the sleeve portion of the armature being placed coaxially with the rings and presenting a separate rim, facing towards the outside of the annular cavity, folded over so as to engage in the sawtooth-shaped throat to immobilize the shield axially in the annular seat.

3 Claims, 2 Drawing Sheets

SEAL BEARING

This is a divisional of copending application(s) Ser. No. 07/278,846 filed on 12/2/88 now U.S. Pat. No. 4,928,371.

FIELD OF THE INVENTION

The present invention relates to an improved sealed bearing and a method for manufacturing such a bearing.

BACKGROUND OF THE INVENTION

Sealed rolling bearings are not new per se. The use of seals to preclude entry of external contaminants, such as water and dust and against the leakage of lubricant grease are common and typically comprise sealing systems at one or both axial ends of the annular space between the bearing rings. In accordance with some prior known sealing systems, the seal comprises one or more flexible lips carried by a rigid reinforcing shield secured in an angularly immobile fashion to one of the bearing rings and producing a sliding seal between the bearing rings in both the axial and radial directions. The seal may be of the type either directly engaging the other ring usually utilizing only one reinforcing shield or indirectly by means of a second reinforcing shield secured as a unit to the other ring and provided with sliding faces.

In both instances, that is, in the case of single or double shielded sealing assemblies, precise axial positioning of the sealing system is essential to achieve the desired sealing action. Otherwise the axial seal will become ineffective and all or part of the sealing action will be destroyed.

It has been found that in prior known bearing assemblies, precise and correct axial positioning of the sealing system is a very complex and costly procedure and requires very careful and precise working of the housing seats to very close and tight tolerances in order to produce the interferences which ensures that the sealing systems are both radially and axially immobilized by friction.

SUMMARY OF THE INVENTION

With the foregoing in mind, it is an object of the present invention to provide an improved sealed bearing and method for assembling the same: wherein axial immobilization of the sealing system in the precisely correct position is ensured without the need for precise working of the housing seats and the tight assembly tolerances. To this end the bearing assembly of the present invention comprises conventional inner and outer rings, a plurality of rolling elements in the annular space between the raceways of the inner and outer rings and at least one sealing system made in accordance with the present invention interposed between the rings for sealing the annular space in the bearing assembly. More specifically, in accordance with the present invention, an annular seat is provided on a separate surface on one of the rings facing the annular space consisting of at least one throat having a step shaped axial profile. The seal includes at least one rigid shield member comprising essentially of a rigid and plastically deformable reinforcing member and a covering made of a elastomeric material overlying at least part of the reinforcing member. The rigid shield further comprises a separate sleeve shaped portion, which is disposed coaxially with the rings and presents a separate rim facing towards the outside of the annular cavity, which is folded over so as to engage in the step shaped throat, to immobilize the shield axially in the annular seat.

A bearing in accordance with the present invention is easy and economical to manufacture and assemble. For example, in accordance with the present invention, one of the rings of the bearings is produced in such a manner to have an annular seat with an axial shoulder facing axially toward the inside of the ring and a step-shaped throat axially toward the outside of the ring. A seal in accordance with the present invention comprises at least one generally rigid shield comprising a reinforcing member made of a relatively rigid and plastically deformable material and having at least a partial covering made of elastomeric material, the reinforcing member including a peripheral portion in the shape of a cylindrical sleeve also provided with an elastomeric covering. The sleeve portion is inserted between the annular seat of the ring up to the axial shoulder with the elastomeric covering interposed. A peripheral edge of the armature is plastically deformed in a predetermined manner to engage the latter in the step-shaped throat again with the interposition of the elastomeric covering.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 2:
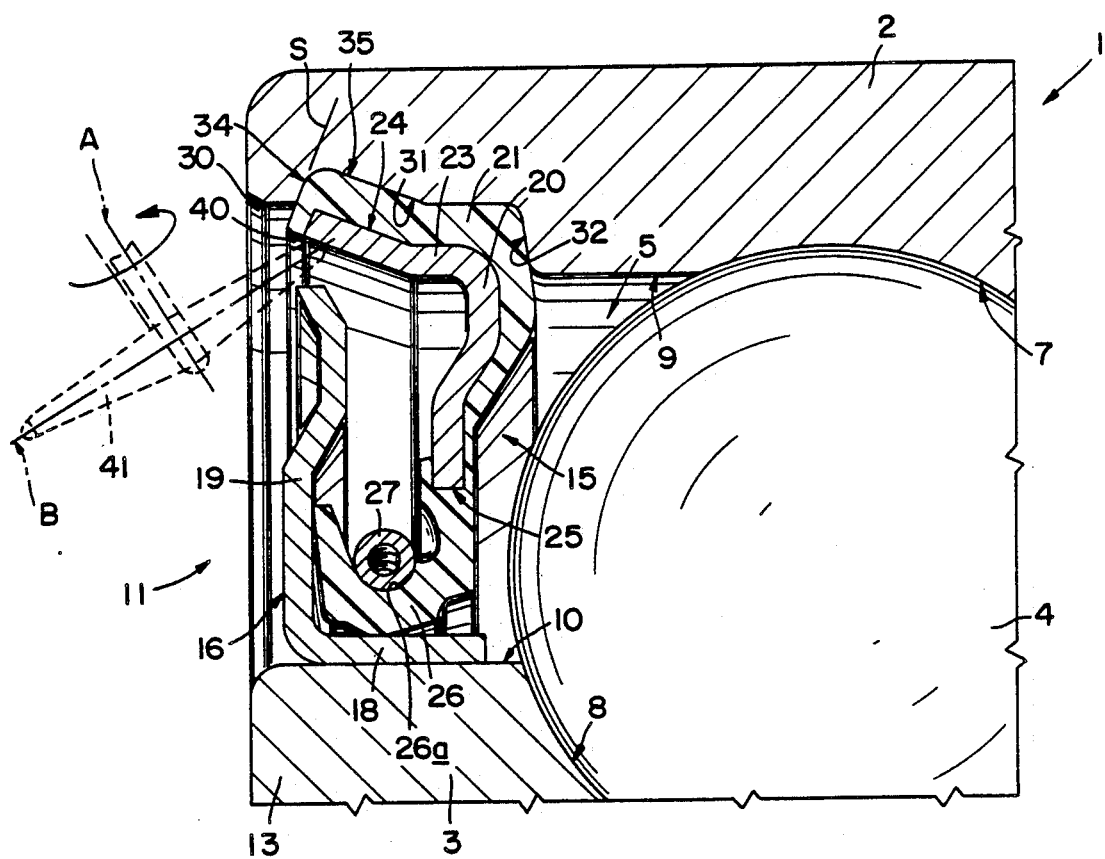
FIG. 2 is a transverse sectional view of the fully assembled bearing assembly and seal system in accordance with the present invention.

Referring now to the drawings and particularly to FIG. 2 thereof, there is illustrated a bearing assembly generally designated by the numeral 1 incorporating a sealing system 11 in accordance with the present invention. Bearing assembly 1 comprises an outer ring 2, an inner ring 3 and a plurality of rolling elements 4, which, in the present instance, are balls mounted in the annular space 5 between the arcuate raceways 7 and 8 on the inner peripheral surfaces of the rings 2 and 3 which typically allows the rings to rotate relative to one another with low friction.

The bearing assembly is provided with sealing systems at opposite axial ends of the annular space to protect the rolling elements 4 and the raceways 7 and 8 from ambient contaminants such as water, dust and the like and also to retain any lubricant grease inside the bearing space 5. For sake of simplicity, the details of the seal at only one axial end of the bearing assembly is illustrated. A similar sealing arrangement may be provided at the opposite axial end of the annular space if desired.

Considering now the sealing system illustrated, the seal system 11 comprises a first shield member 15 and a second shield member 16 mounted coaxially inside the shield member 15. The second shield member 16 is adapted to be mounted in an angularly immobile manner to the inner ring 3 and consists of a reinforcing element made of sheet metal, cut and folded to define a central portion 18 in the form of a cylindrical sleeve designed to friction fit the surface 10 to support the inner shield 16 to the inner ring 3 by friction and an annular peripheral flange shape portion 19 disposed generally perpendicularly to the axis of the portion 18 and spaced outwardly confronting the shield member 15.

The shield member 15 is designed to be coupled in an angularly unitary manner to the outer ring member 2 and comprises a reinforcing member 20 made of sheet metal, cut and folded in a predetermined manner to produce relatively high rigidity but nevertheless is plastically deformable. The reinforcing member 20, in the present instance, has an outer coating 21 made of an elastomeric material such as rubber which is unitarily bonded to the reinforcing member 20 by vulcanization. As illustrated the reinforcing member 20 is generally cup shaped comprising a central annular portion 22 defining a radial will of the reinforcing member 20 and a peripheral portion formed integrally therewith in the shape of a cylindrical sleeve 23 which defines a lateral wall of the reinforcing member generally coaxially aligned with the central annular portion 22. This sleeve 23 also lies coaxially to the portion 18 of the shield member 16 and with the ring members 2 and 3. The shield 15 is mounted in the outer ring by the lateral wall portion 23. Further as illustrated the shield portion 23 is completely covered on its outer surface 24 by an elastomeric cover 21. The cover 21 projects radially beyond an internal rim 25 of the annular portion 22 and in this manner defines one or more elastically deformable sealing lips capable of interacting in a sliding manner with the shield member 16 and/or directly with the ring 2 to produce a sliding sealing action. In the particular embodiment illustrated, the cover 21 defines a single V-shaped lip 26 having a seat 26a for an annular compression spring 27 with the lateral and radial portions 18 and 19 respectively of the shield member 16 to produce a sealing effect in a radial and axial direction between the rings 2 and 3.

In accordance with the present invention, one of the rings, in the present instance, the outer ring which supports the shield member 15 is formed on a land surface 9 adjacent the raceways with an annular housing seat 30 for the sealing system of the present invention. In the present instance, the housing seat 30 is configured for the shield member 15 and comprises an annular throat section 31 having an axial profile, namely the one extending along the axis of symmetry of the rings 2 and 3 which is of a saw tooth shape. The throat 31 faces axially away from the bearing cavity 5 and has on its inner axial portion, a peripheral extending shoulder 32 defining a stop facing the throat 31 and capable of interacting with the shield member 15 to fix it axially in the seat 30 to immobilize or fix it axially in the seat 30 towards the inside of the bearing cavity 5. The saw tooth axial profile of the throat 31 is defined by first and second oblique side surfaces or conical wall segments 34 and 35 respectively which are opposed and face one another with opposing slopes, the peripheral side 34 being located towards the outside of the cavity 5 and having a lesser axial length L and greater slope S than those of the sides 35 with respect to the common axis of symmetry of the rings 2 and 3.

Consider the assembled relation of the sleeve member 15 in the seat 30 shown in FIG. 2. As illustrated therein, the seat 30 is engaged by the sleeve portion 23 of the reinforcing member 20 of the shield 15 wherein the interposition of the elastomeric cover 21 secures the surface 24 and wherein the sleeve portion 23 presents a separate peripheral end rim 40 facing axially toward the outside of the bearing cavity 5 folded over and flared radially outwardly so as to engage in the throat and specifically and engaging in a particular manner to pinch the elastomeric covering 21 between the oblique frusto-conical lateral sides 34 and 35. This action immobilizes the shield member 15 in the seat 30 axially and with it the entire sealing system 11.

Consider more specifically the manufacture and assembly of a bearing assembly and a seal system in accordance with the present invention. The rings 2 and 3 and balls 4 are conventional and are produced by and manufactured by conventional known procedures. The seat 30 with its corresponding shoulder 32 and saw tooth throat 31 may be formed in the ring by known methods such as casting or grinding. Likewise the sealing system 11 may be produced by an conventional techniques with particular care being directed so that the entire sleeve portion 23 of the reinforcing member of the shield designed to engage with the seat 30 is covered with an elastomeric material such as rubber.

Figure 1:
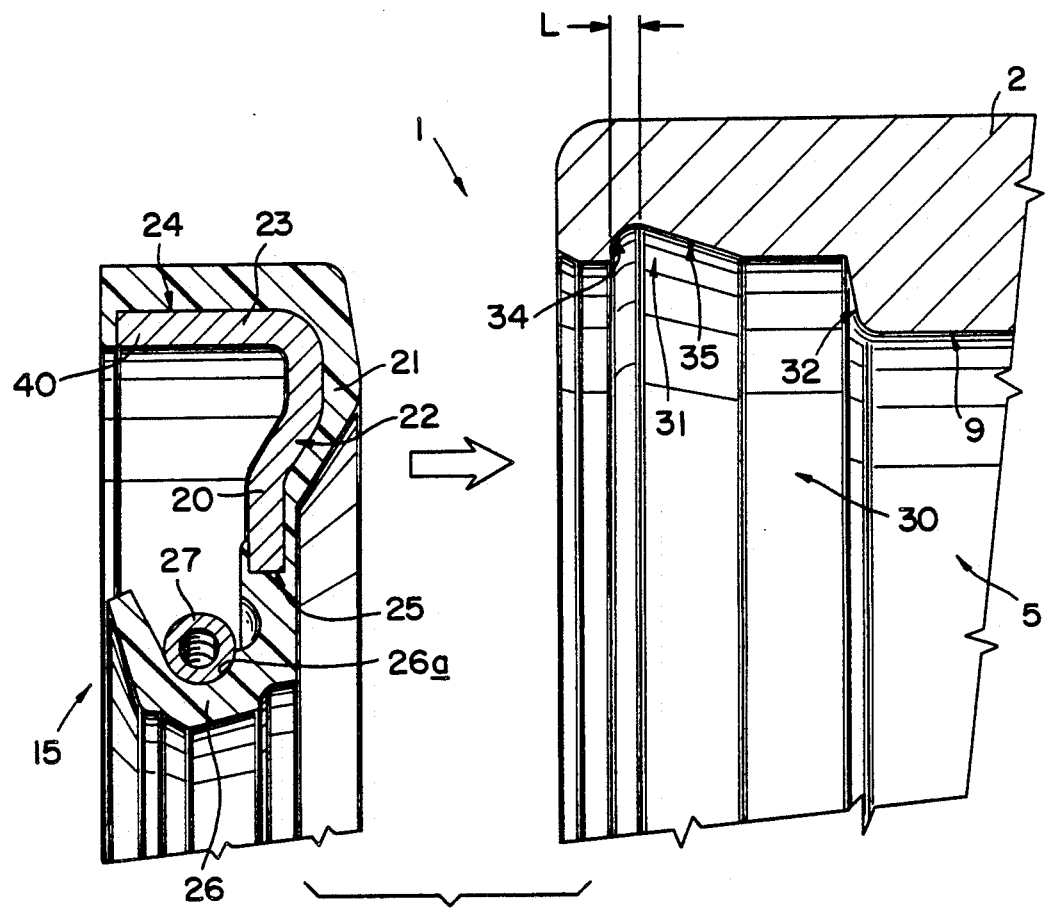
FIG. 1 is a transverse sectional view of parts of the bearing assembly and seal system of the present invention with the seal system in position to be assembled to one of the rings.

Considering now the assembly of the elements and first looking at FIG. 1, the sleeve portion 23 of the shield member 15 is introduced into the annular seat 30. Since as illustrated in FIG. 1, the portion 23 in its preassembled form is generally cylindrical, the shield member 15 slides into the seat easily until it contacts the shoulder 32. Any dimensional deviations in the seat 30 are compensated for by the elastic deformation of the elastomeric layer 21 interposed between the seat 30 and the reinforcing member 20. The outer shield member 16 is then pressed into the inner ring 3 and this controls the axial pressure exerted by the lip 26. With this member in place, the peripheral rim 40 of the cylindrical reinforcing portion 23 is plastically deformed by a suitable tool member so as to fold it over inside the throat 31 which is consequently engaged by the rim 40. This deformation of the rim 40 can be done in sections, or by beveling or over the entire rim 40 by a rolling action using a rotating tool 41 which is rotated about an axis A and simultaneously pressed against the rim 40 so as to exert thereon a pressure towards the throat 31 in the direction of a pressure axis B generally perpendicularly disposed to the axis A (SEE FIG. 2).

The present invention provides certain functional advantages over the prior art discussed above. The following recaps those advantages. For example, in a bearing assembly constructed in accordance with the present invention, there is no need to form the seat for the sealing system in the outer ring with precise tolerances to achieve the good seating action discussed above. Furthermore, the novel configuration produces correct axial positioning of the sealing elements and this positioning is ensured by the axial immobilization of the shield member fitted with the sealing lips. By this arrangement during use, a perfectly effective seal is provided in the axial direction between the rotatable rings all in a simple and economic assembly.

Even though a particular embodiment of the invention has been illustrated and described herein, it is not intended to limit the invention and changes and modifications may be made therein within the scope of the following claims. For example, even though the sealing system described utilizes two (2) shield members, a single shield member may be utilized wherein the lips interact directly with the inner ring and a profiled seat is produced directly on the surface 10. Further it is possible to interchange the positions of the shields, that is the shield equipped with the sealing lips may be mounted on the inner ring rather than the outer ring. Further while the bearing assembly illustrated as one utilizing balls as rolling elements, the advantages of the present invention have equal application to other types of bearing assemblies utilizing rollers for example. Also, the present invention has equal application to assemblies with plural rows of rolling elements.

What is claimed is:

1. Bearing assembly comprising spaced inner and outer rings defining an annular space therebetween and a plurality of rolling elements in the annular space between the rings, means defining a seat on the inner peripheral surface of one of said rings facing said annular space including a throat section having a sawtooth-shaped axial profile defined by a first and second oblique lateral side surfaces facing one another and having opposite slopes, said first side surface being located toward the outside of the said annular space and having, with respect to a common axis of symmetry of said rings, a lesser axial length and greater slope than said second side surface, a seal system at least at one axial end of said annular space, comprising at least one generally rigid shield member, a cover member of resilient material covering at least a portion of said shield member, said shield member including a separate sleeve-shaped portion and with interposition of at least part of the said elastomeric covering in the said annular seat, said sleeve portion being placed coaxially within said ring and presenting a separate rim facing towards the outside of the said annular space, folded over so as to engage in the said sawtooth-shaped throat to immobilize the said shield axially in the said annular seat.

2. A bearing assembly according to claim 1, wherein said annular seat for the said shield is produced in an internal surface of said outer ring and wherein said sealing system includes a second shield member, installed coaxially with the inside of the said sleeve portion of the first shield member and fitted in an angularly unitary fashion to the said inner ring, said shields interacting with on another in an essentially fluid-tight manner.

3. Bearing assembly comprising spaced inner and outer rings defining an annular space therebetween and a plurality of rolling elements in the annular space between the rings, means defining a seat on the inner peripheral surface of one of said rings facing said annular space including a throat section having a sawtooth-shaped axial profile defined by a axially spaced generally radially directed wall surfaces, a seal system at least at one axial end of said annular space, comprising at least one generally rigid shield member including a separate sleeve-shaped portion, a cover member of resilient material covering at least a portion of said shield member, and interposed between said shield member and seat and completely filling the space between said wall surface and seat, said sleeve portion being placed coaxially within said ring and presenting a separate rim facing towards the outside of the said annular space, folded over so as to engage in the said sawtooth-shaped throat to immobilize the said shield axially and radially in the said annular seat.

* * * * *